US007938969B2

(12) United States Patent
Colvin et al.

(10) Patent No.: US 7,938,969 B2
(45) Date of Patent: May 10, 2011

(54) MAGNETIC PURIFICATION OF A SAMPLE

(75) Inventors: Vicki Leigh Colvin, Houston, TX (US); Cafer Tayyar Yavuz, Goleta, CA (US); John Thomas Mayo, Houston, TX (US); Weiyong Yu, Rutland, MA (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 12/436,949

(22) Filed: May 7, 2009

(65) Prior Publication Data

US 2009/0308814 A1 Dec. 17, 2009

Related U.S. Application Data

(63) Continuation of application No. PCT/US2007/083799, filed on Nov. 6, 2007.

(60) Provisional application No. 60/864,782, filed on Nov. 7, 2006.

(51) Int. Cl.

| | |
|---|---|
| ***B03C 1/01*** | (2006.01) |
| ***B03C 1/02*** | (2006.01) |
| ***C02F 1/48*** | (2006.01) |

(52) U.S. Cl. ......... 210/695; 436/177; 436/526; 435/7.2; 435/173.9; 427/598; 252/62.51 R; 209/214

(58) Field of Classification Search .................. 977/775; 436/177, 526; 435/7.2, 173.9; 427/598; 252/62.51 R; 210/695; 209/214

See application file for complete search history.

(56) References Cited

U.S. PATENT DOCUMENTS

| | | | | |
|---|---|---|---|---|
| 2005/0277128 | A1* | 12/2005 | Banerjee et al. | 436/526 |
| 2006/0249705 | A1* | 11/2006 | Wang et al. | 252/62.51 R |

* cited by examiner

*Primary Examiner* — David A Reifsnyder

(74) *Attorney, Agent, or Firm* — Baker Botts L.L.P.

(57) ABSTRACT

Methods for separating magnetic nanoparticles are provided. In certain embodiments, a method is provided for separating magnetic nanoparticles comprising: providing a sample comprising a plurality of magnetic nanoparticles; passing the sample through a first magnetic field; at least partially isolating nanoparticles of the first nanoparticle size desired; altering the strength of the first magnetic field to produce a second magnetic field; and at least partially isolating nanoparticles of the second nanoparticle size desired.

Figure 1:
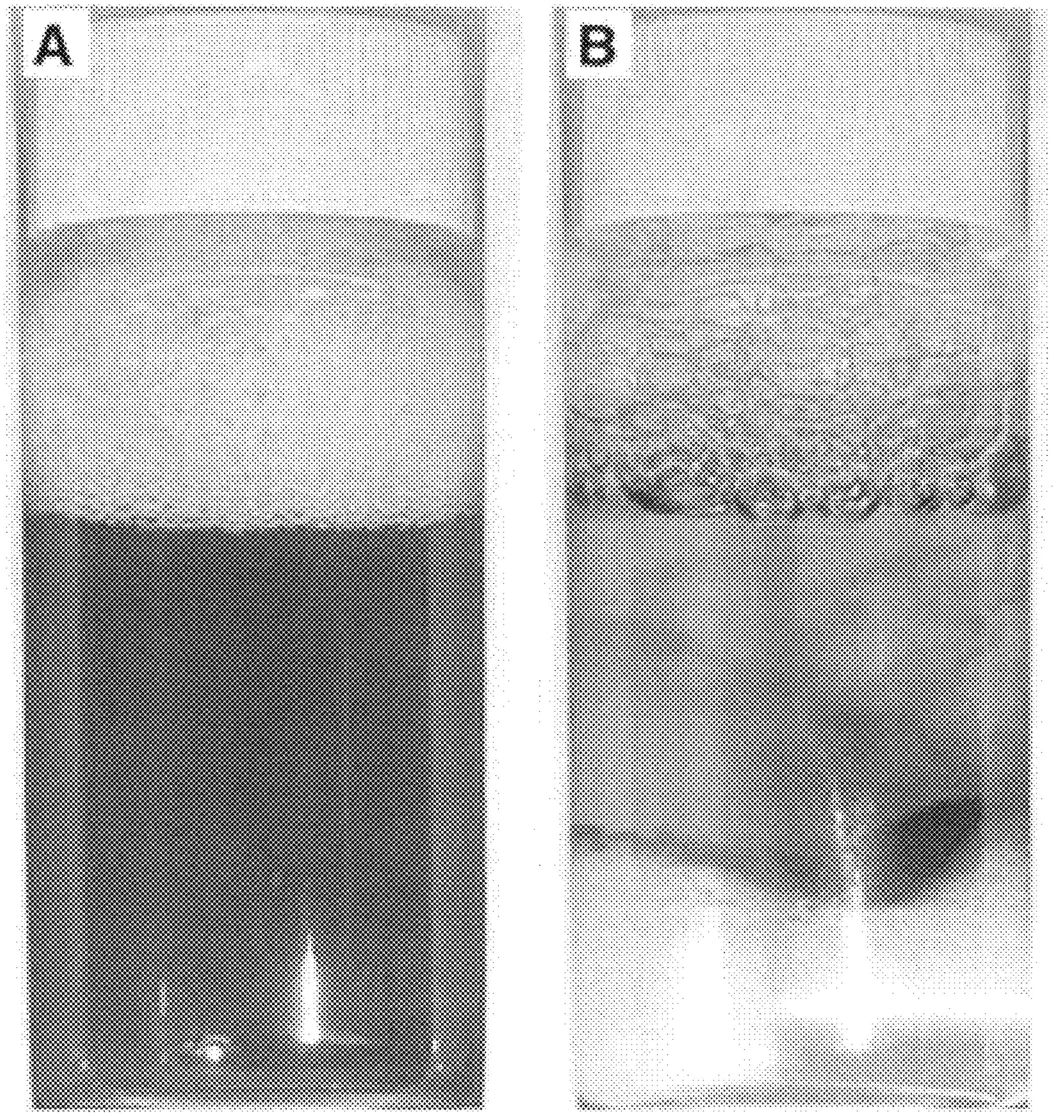

20 Claims, 18 Drawing Sheets
(16 of 18 Drawing Sheet(s) Filed in Color)

MAGNETIC PURIFICATION OF A SAMPLE

This application is a continuation of International Application No. PCT/US2007/083799, filed Nov. 6, 2007, which claims the benefit of U.S. Provisional Application Ser. No. 60/864,782, filed Nov. 7, 2006, both of which are incorporated in this application by reference.

STATEMENT OF GOVERNMENT INTEREST

This disclosure was made with support under grant numbers EEC-0118007 and EEC-0647452 awarded by the National Science Foundation. The U.S. government has certain rights in the invention.

BACKGROUND

The present disclosure, according to certain embodiments, generally relates to particle separation. More specifically, the present disclosure, according to certain embodiments, relates to methods for separating magnetic nanoparticles.

The removal of particles from solution with magnetic fields may be, among other things, more selective and efficient (and often much faster) than traditional centrifugation or filtration techniques. As a result, magnetic separations may be used in fields including, but not limited to, biotechnology and ore refinement. In many cases, the process utilizes the generation of magnetic forces on particles large enough to overcome opposing forces such as Brownian motion, viscous drag, and sedimentation. In biotechnology, for example, magnetic separators may use relatively low field gradients in a batch mode to concentrate surface-engineered magnetic beads from a suspension. For manufacturing, magnetic materials may be recovered from waste streams under flow conditions with high-gradient magnetic separators (HGMS) that use larger fields (up to 2 Tesla) and columns filled with ferromagnetic materials.

Decreasing the particle sizes used in magnetic separations from microns to nanometers may increase the available sorptive areas by at least about hundred times. Such material optimization, however, is not generally practical because the magnetic force acting on a particle in a field gradient is proportion to the particle volume. If particles are too small, their magnetic tractive forces in a field gradient may not be large enough to overcome Brownian motion, and little or no separation may occur. For iron oxide, extrapolations from the behavior of the bulk material suggest that the critical size for separation is about 50 nm for the case of an isolated (non-aggregated) particle. This treatment assumes very large applied fields and the latest designs for extremely high-gradient separators, both features that may make magnetic separations prohibitively expensive in many settings. For simpler and less costly low gradient separators, the critical size for capture in magnetic gradients may increase substantially.

Extrapolations from bulk properties to nanoscale materials are frequently problematic, and a more comprehensive analysis of nanoscale magnetic behavior suggests that nanocrystals (NCs) could offer a significant opportunity for low field magnetic separations. Below about 50 nm diameter, nanoscale magnets may exhibit a complex range of size-dependent behaviors, including, but not limited to, a transition below about 40 nm in size to single domain character, magnetic susceptibilities greater than that of the bulk material, and the emergence of superparamagnetic behavior. Such systems may experience larger magnetic forces than expected from bulk behavior due to larger moments. Advantages of higher susceptibility materials, such as FeCo, have been suggested, in which an increased magnetic moment could in principle enable high-gradient separations with isolated nanocrystals. Additionally, in external fields, the large surface gradients present at the surfaces of single domain materials may induce transient aggregation, effectively forming larger and more magnetically responsive particles. Nanoparticle aggregation, even before field application, has been posited to explain the observation of the magnetic capture of polydisperse nanocrystals in a high-gradient separation (>1000 T/m) using fields of 1 to 2 Tesla.

SUMMARY

The present disclosure, according to certain embodiments, generally relates to particle separation. More specifically, the present disclosure, according to certain embodiments, relates to methods for separating magnetic nanoparticles.

In certain embodiments, the present disclosure relates to a method for separating magnetic nanoparticles, the method comprising: providing a sample comprising a plurality of magnetic nanoparticles; passing the sample through a first magnetic field; at least partially isolating nanoparticles of the first nanoparticle size desired; altering the strength of the first magnetic field to produce a second magnetic field; and at least partially isolating nanoparticles of the second nanoparticle size desired.

In certain embodiments, the present disclosure relates to a method of isolating magnetic nanoparticles of a desired size, the method comprising: providing a sample comprising a plurality of nanoparticles; passing the sample through a first magnetic field to remove at least a portion of the nanoparticles in the sample having an average diameter substantially less than the desired size; altering the strength of the first magnetic field to produce a second magnetic field of sufficient strength to isolate at least a portion of the nanoparticles of an average diameter substantially greater than the desired size; and recovering the nanoparticles of the desired size from the magnetic field.

In certain embodiments, the present disclosure relates to a sample comprising a plurality of magnetic nanoparticles formed by a method of the present disclosure.

In certain embodiments, the present disclosure relates to a method for separating magnetic nanoparticles from non-magnetic substances, the method comprising: providing a sample comprising a plurality of magnetic nanoparticles; and passing the sample through a low magnetic field gradient.

In certain embodiments, the present disclosure relates to a method of removing arsenic from a sample, the method comprising: providing a sample comprising arsenic; introducing into the sample magnetic nanoparticles; allowing the magnetic nanoparticles to interact with at least a portion of the arsenic; and passing the sample through a magnetic field to remove at least a portion of the arsenic.

DRAWINGS

The patent or application file contains at least one drawing executed in color. Copies of this patent or patent application publication with color drawing(s) will be provided by the Office upon request and payment of the necessary fee.

Some specific example embodiments of the disclosure may be understood by referring, in part, to the following description and the accompanying drawings.

FIG. 1 shows magnetic batch separation of 16 nm water soluble $Fe_3O_4$ NCs (nanocrystals) with a conventional separator, Dexter Magnetic LifeSep 50SX. The field gradient at full field was 23.3 T/m. (A) Appearance of the solution immediately after placement in the separator. (B) After several minutes, the initially homogeneous solution becomes heterogeneous and a black deposit forms on the back wall where the gradient field is the highest.

Figure 2:
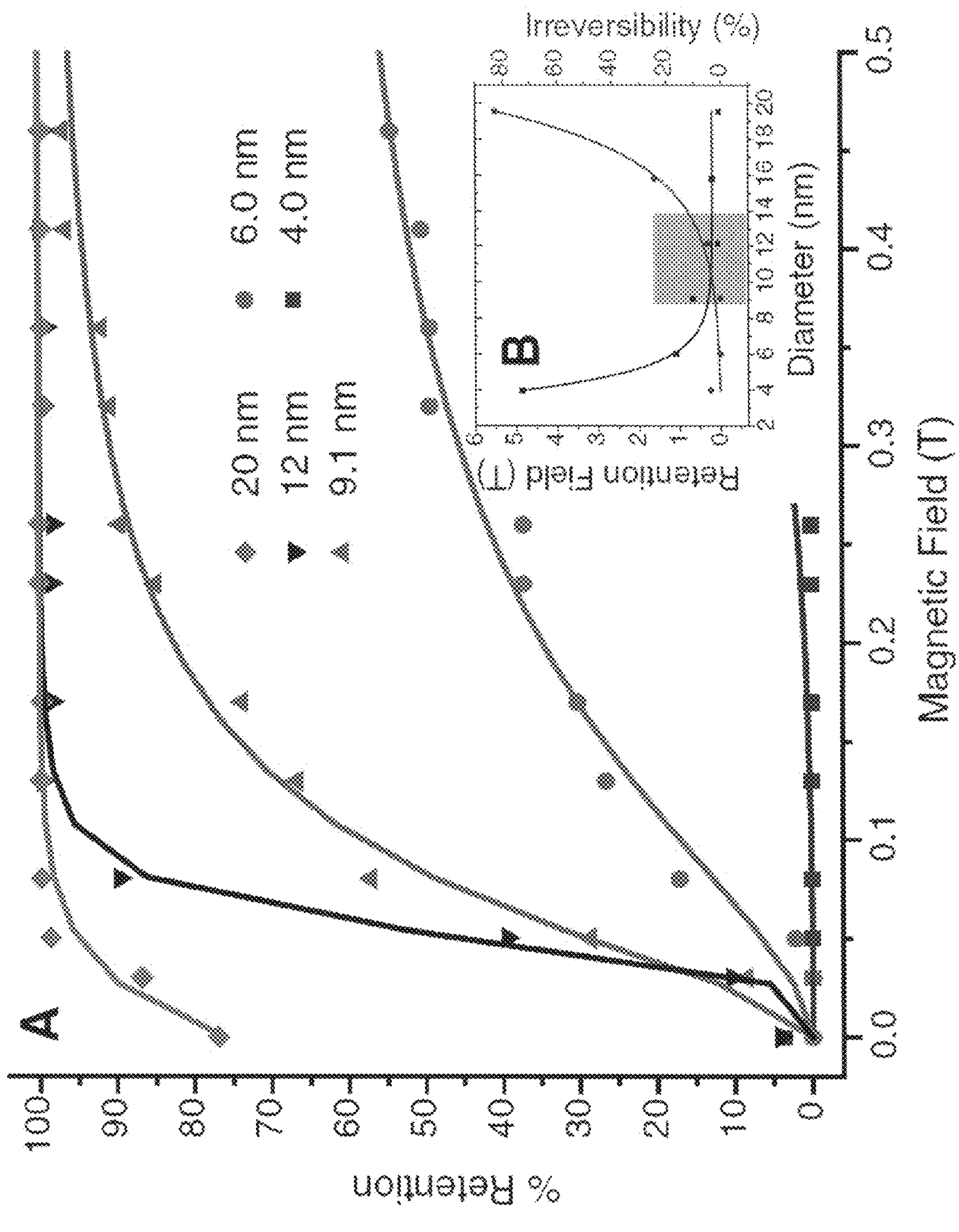

FIG. 2 shows (A) Size-dependent magnetic separation of 4.0, 6.0, 9.1, 12 and 20 nm $Fe_3O_4$ in a column separator. For this work, a hexane dispersion of NCs was passed through a stainless steel column packed with 15 grams of stainless steel wool; solutions were introduced at 20 mL/min using gravity feed. The column was held in an S. G. FRANTZ® canister separator (tunable field 0 to 1.6 Tesla). After each data point was taken, the packing was removed and the column was washed thoroughly, dried in an oven (60° C.), and packed with clean, unused, stainless steel wool. Fractions collected at each data point were digested in conc. $HNO_3$ and diluted to 5.5% $HNO_3$ before iron content analysis using ICP-AES. The % retention was calculated by dividing the atomic iron concentration in a solution by the concentration found for the starting (unseparated) suspension. Curves presented are complex polynomials meant to guide the display and are not reflective of any physical model. These data illustrate that the smaller the NC, the greater the magnetic field required retaining the NC in the column. The 20 nm diameter particles permanently affix to the column after removal of the field. (B) The absolute field required to retain 100% of the NCs loaded to the stainless steel column (black) versus the diameter of $Fe_3O_4$ NCs is presented. Also shown (right axis) are the fractions of material that are unrecoverable after washing the column. The shaded area represents the optimal size for magnetic separations. For 4.0 nm and 6.0 nm, materials which were not completely retained, the absolute field for complete retention was estimated from their low field behavior.

Figure 3:
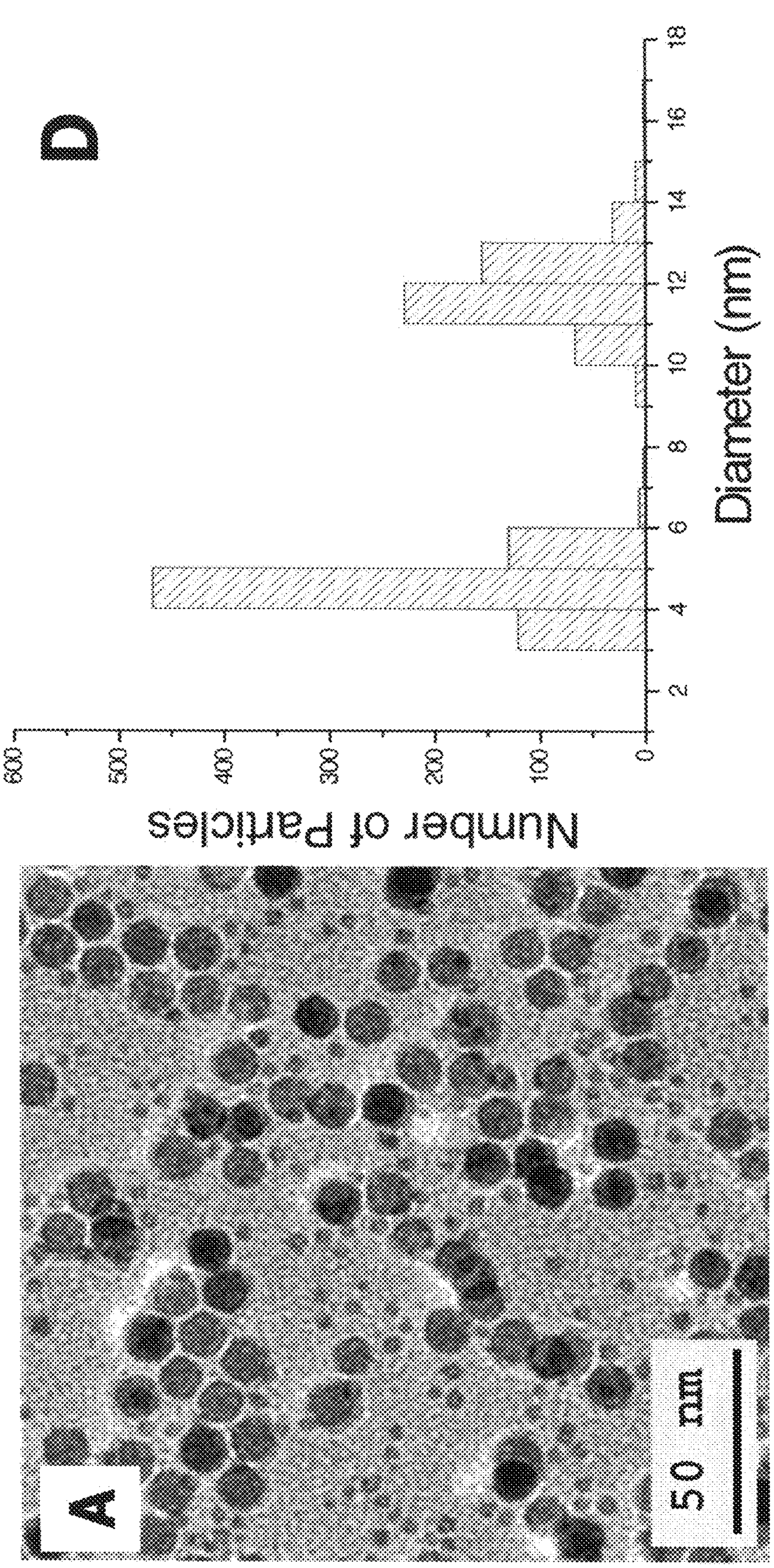
Figure 3:
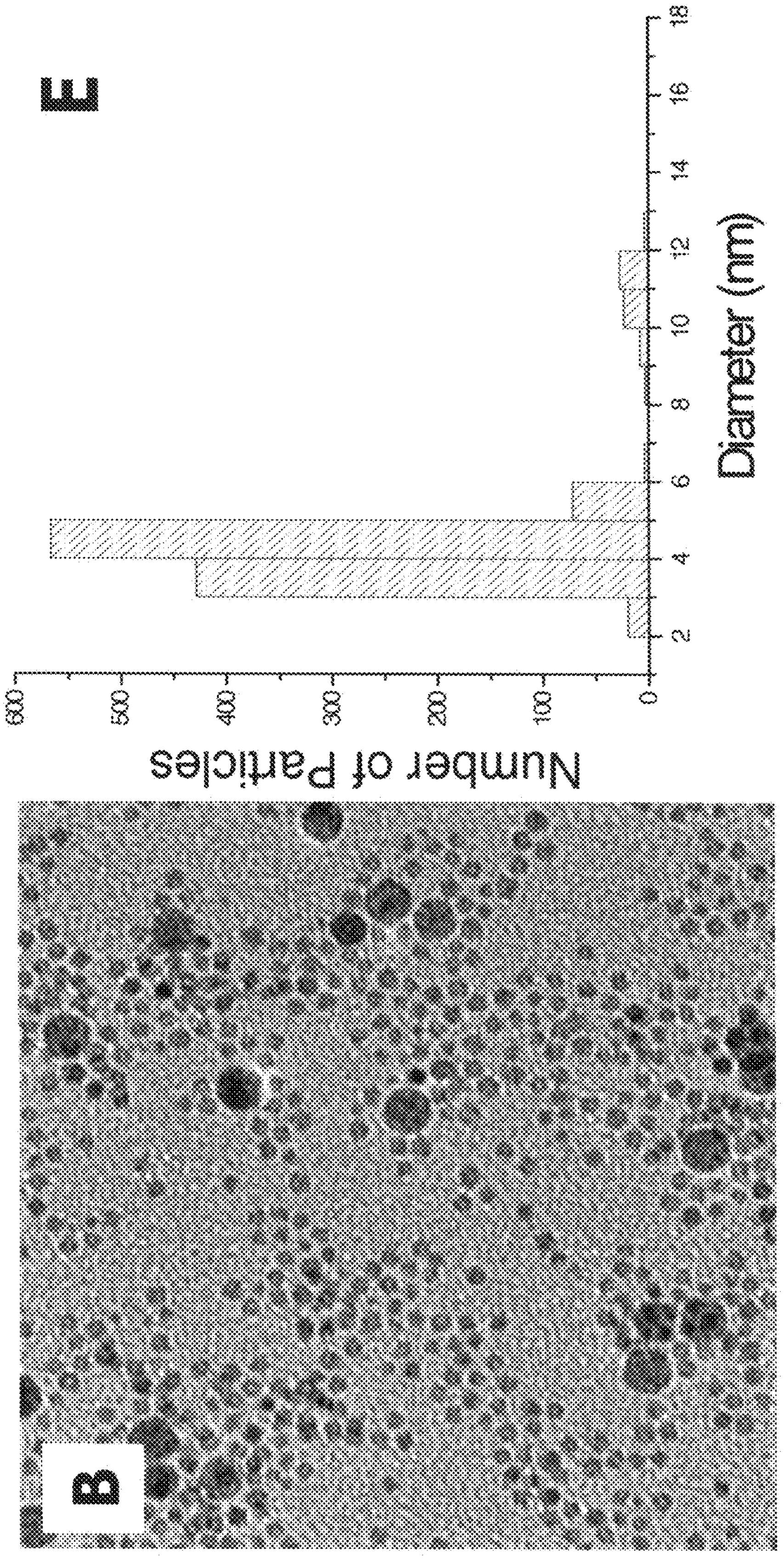
Figure 3:
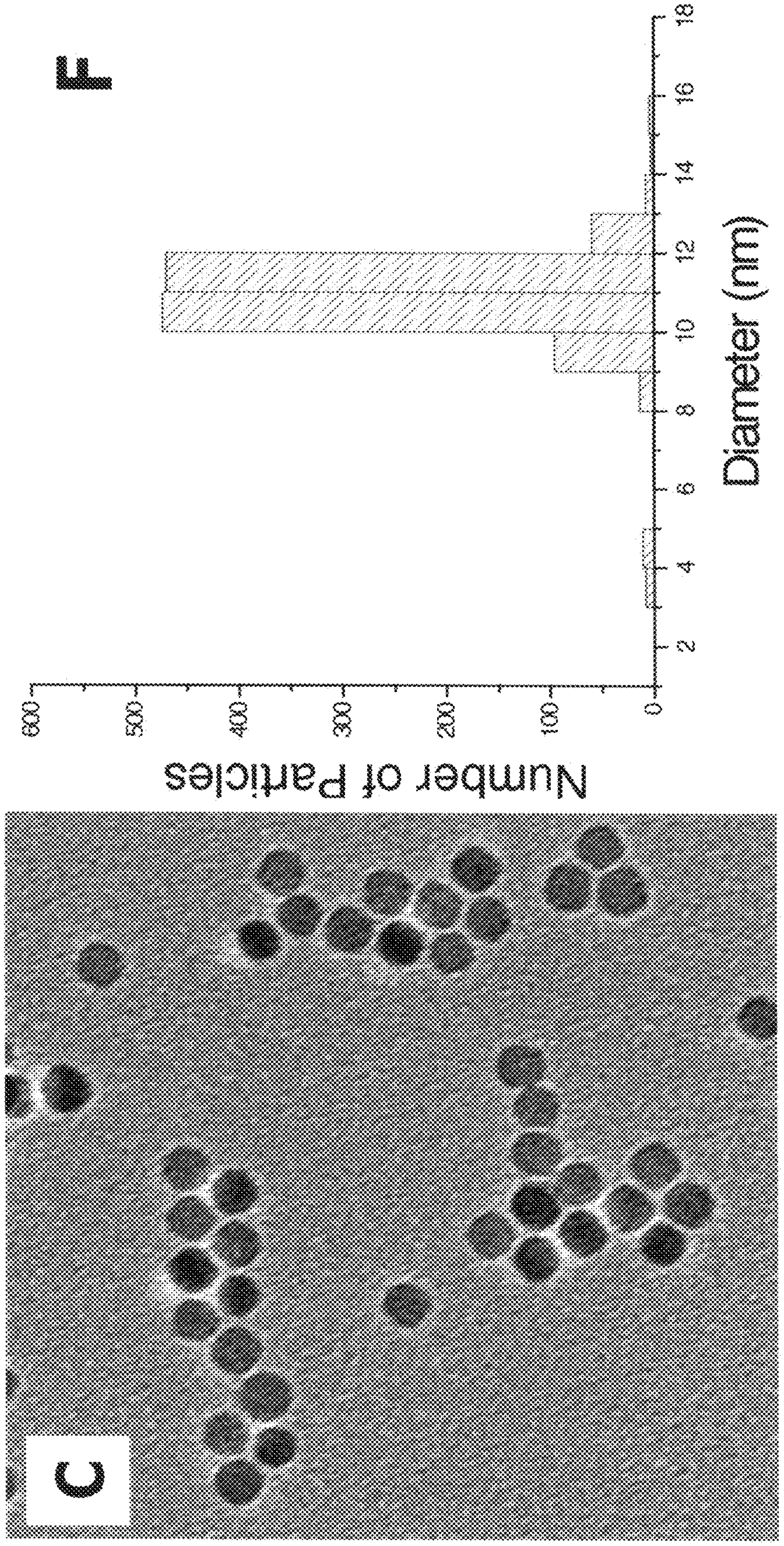

FIG. 3 shows multiplexed separation of nanocrystal mixtures. 4.0 nm and 12 nm $Fe_3O_4$ nanocrystal solutions (both in hexanes) were mixed in a 1:3 ratio (v/v) to achieve a particle mixture that was roughly the same concentration of each size. Using an S. G. Frantz® Canister Separator (Model L1-CN) the mixture separated into two size fractions depending on the field. (A) TEM micrograph of the initial bimodal mixture. (B) TEM micrograph of the higher field (0.3 T) fraction. In this work, 94.4% of 4.0 nm recovered and less than 3% of the particles are larger. Size bar is the same as FIG. 3A. (C) TEM micrograph of the lower field (0.03 T) fraction. 98.3% of larger (12 nm) nanocrystals are collected. FIGS. 3D to 3F depict size distribution histograms for FIGS. 3A to 3C, respectively. In (A) two different populations are observed. In (B) the smaller size range is apparent as observed in the TEM micrograph. In (C) the larger sizes are successfully recovered separation. For all size histograms >1000 particles were counted in multiple images and measured automatically using the software package IMAGEPRO®.

Figure 4:
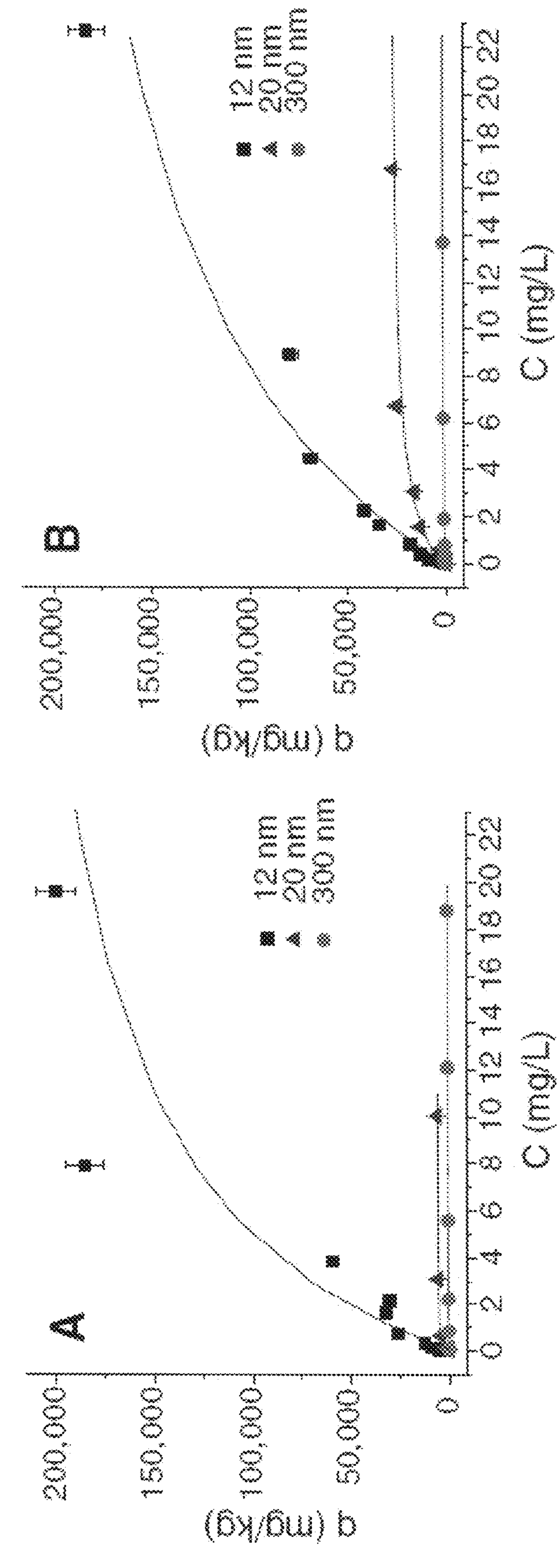

FIG. 4 shows arsenic adsorption studies with nanocrystalline (12 nm) and commercially available magnetite (20 and 300 nm). The smaller (12 nm) magnetite was made water-soluble using a surfactant; for this, the nanocrystal solution was sonicated with an aqueous dispersion of a secondary surfactant, IGEPAL CO 630® and then purified by sedimentation [50 000 rpm (141 000 g)]. Arsenic adsorption experiments were performed with 25 μg/L to 25 mg/L As(III) and As(V) solutions, prepared in electrolyte solution containing 0.01 M NaCl, 0.01 M THAM buffer, and 0.01 M $NaN_3$ at pH 8. All experiments were performed in batch with 10 and 100 mg/L magnetite for the 12 and 20 nm particles, and 2.5 g/L magnetite for the 300 nm particles. Equilibrium time was 24 hours with constant tumbling. The solution was separated from magnetite by a magnetic field column separator, S. G. FRANTZ® Canister Separator (Model L1-CN). After the effluent was collected, the magnet was turned off, and 40 ml DI water was passed through the separator to elute magnetite. All effluents were acidified with the trace metal grade $HNO_3$ to contain 1% $HNO_3$ in solution. Arsenic concentration was measured with ICP-MS. The nanoscale magnetite was acid digested and the Fe and As concentrations in the digest were measured by ICP-AES and ICP-MS, respectively. (A) As(V) adsorption to magnetites of different size; (B) As(III) adsorption.

Figure 5:
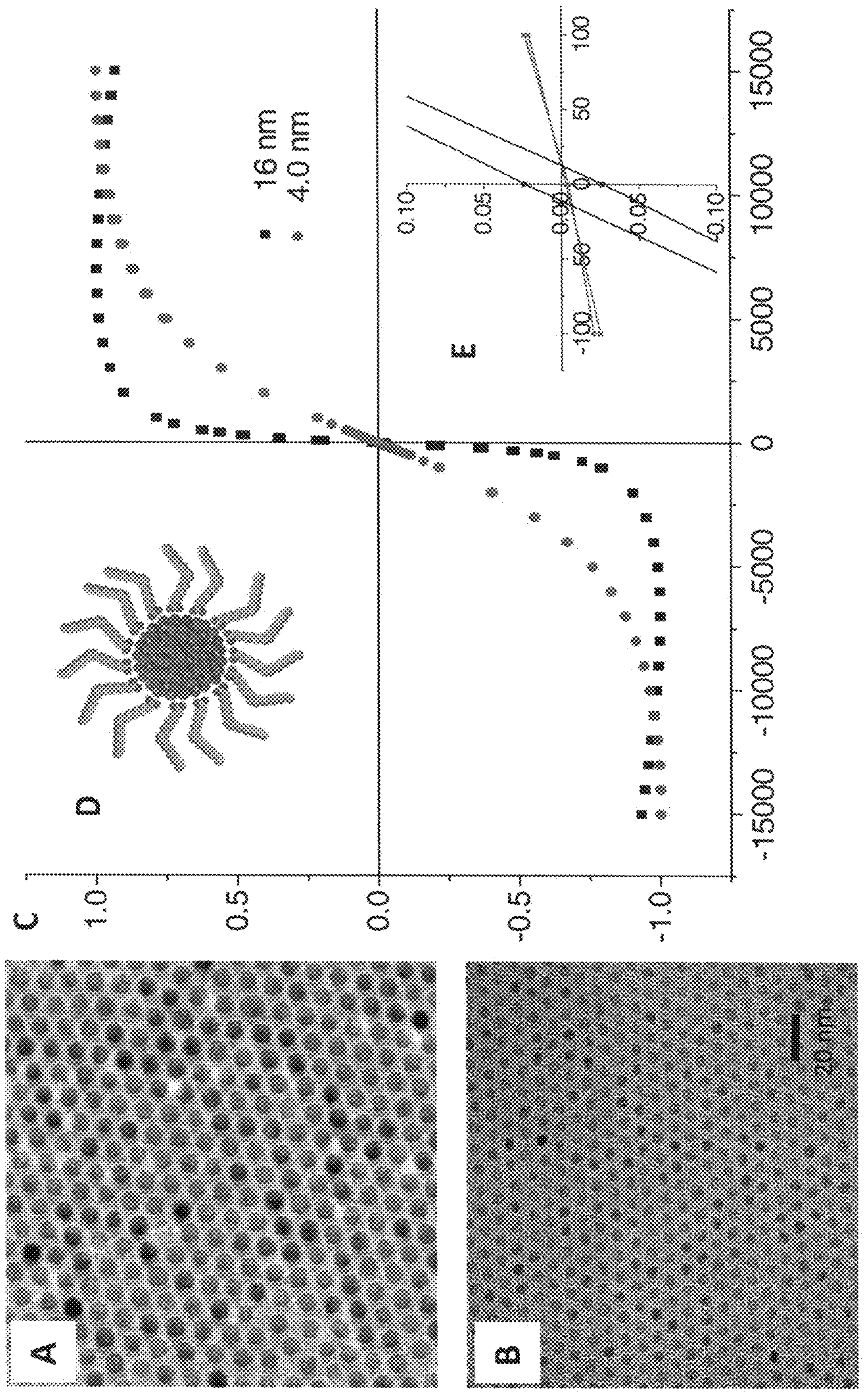

FIGS. 5A and 5B show TEM micrographs showing arrays of highly monodisperse $Fe_3O_4$ NCs. The materials were synthesized from the high temperature (320° C.) decomposition of finely ground Fe(O)OH (0.178 g.) in oleic acid (2.26 g.) using 1-octadecene (5.00 g.) as a solvent. Contrast differences in the images reflect the crystalline nature of the NCs and their random orientations with respect to the electron beam. FIG. 5A shows particles of average diameter 12±1.0 nm while panel FIG. 5B samples are 4.0±0.3 nm. The smaller sizes are synthesized by refluxing at 265° C. a mixture of 2 mmoles of $Fe(acac)_3$, 10 mmoles of 1,2-hexadecanediol, 6 mmoles of oleic acid, 6 mmoles of oleylamine and diphenyl ether (solvent) under nitrogen. FIG. 5C is a graph depicting normalized magnetization (magnetization/maximum magnetization) vs. applied field (Oe) for two representative samples, 16 nm and 4.0 nm NCs. These samples have no magnetic moment unless an external field is applied; as expected, the larger size reaches its saturation magnetization at lower field than the smaller size. FIG. 5D is a schematic of an oleic acid coated magnetite NC [circles are iron (black), oxygen (red) and carbon (blue)—hydrogens were omitted for clarity]. The surface coating adds about 3.6 nm to the core diameter in defining the hydrodynamic diameter. FIG. 5E (inset) shows an expansion of the magnetization data near zero field (−100 Oe to 100 Oe). Both of these materials show no residual magnetization at zero applied field.

Figure 6:
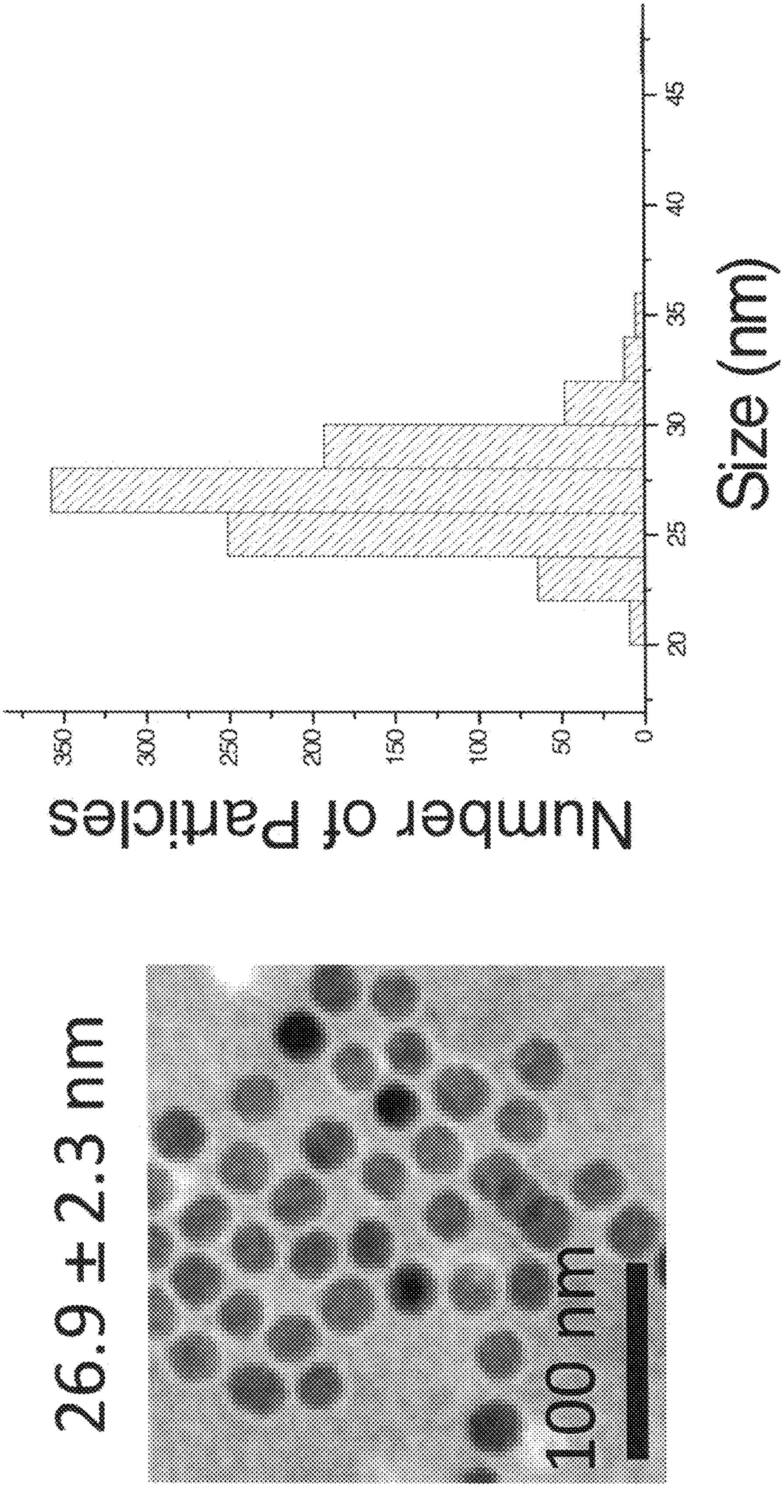
Figure 6:
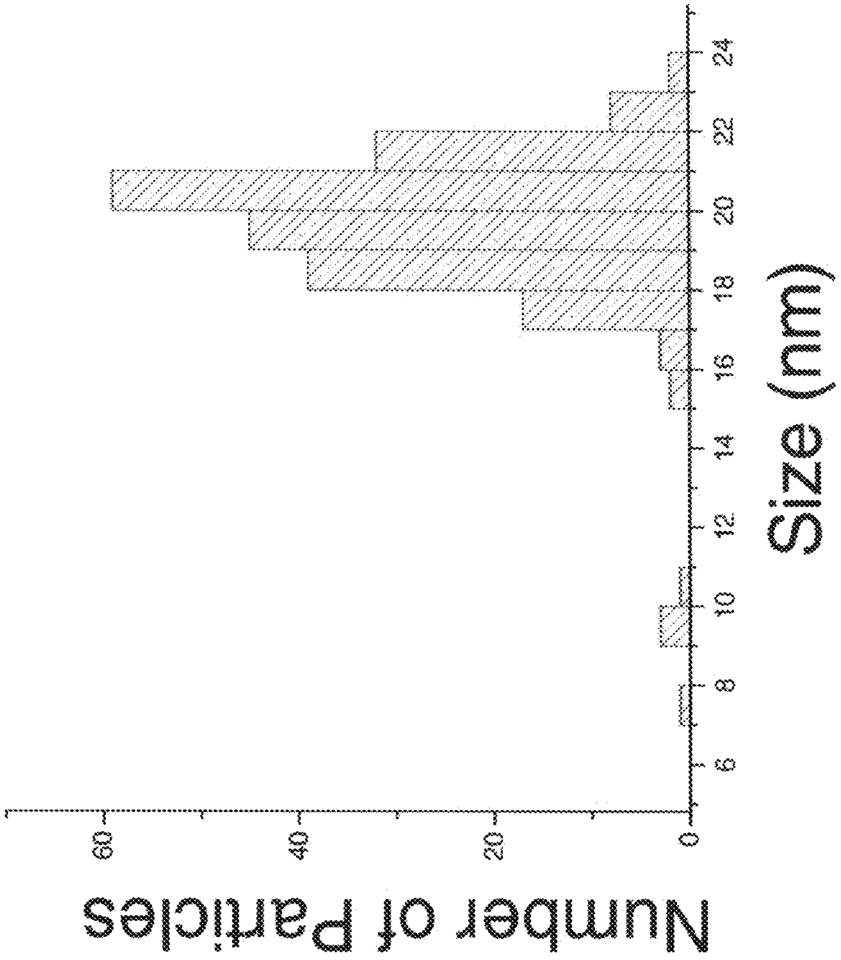
Figure 6:
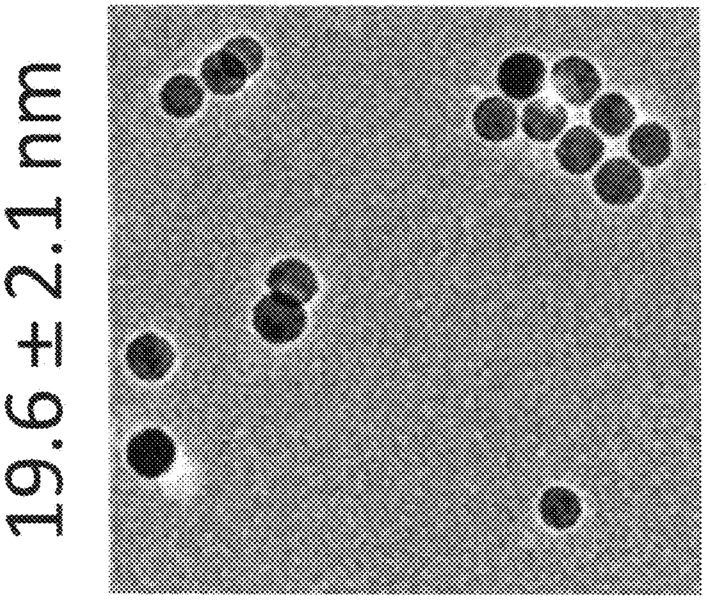
Figure 6:
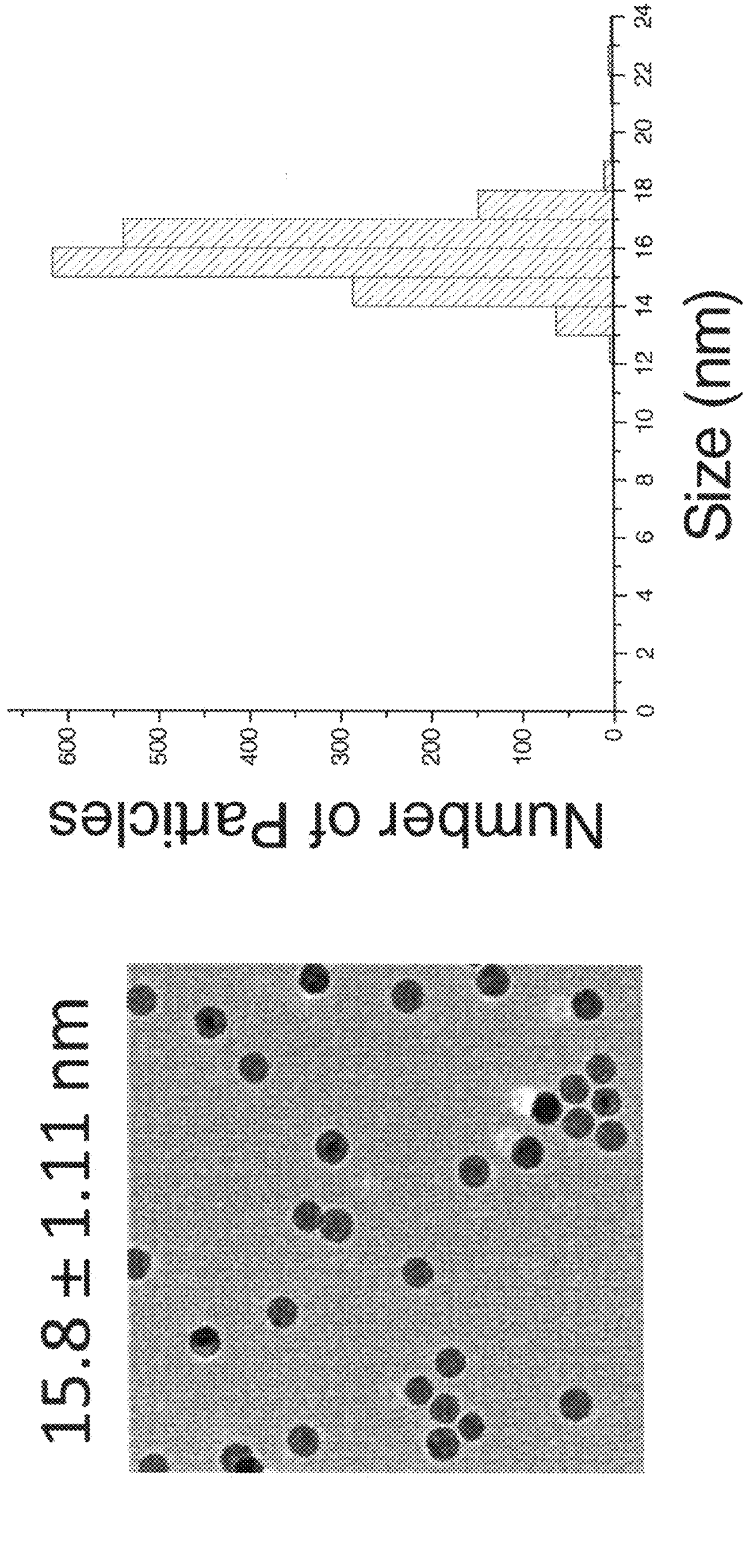
Figure 6:
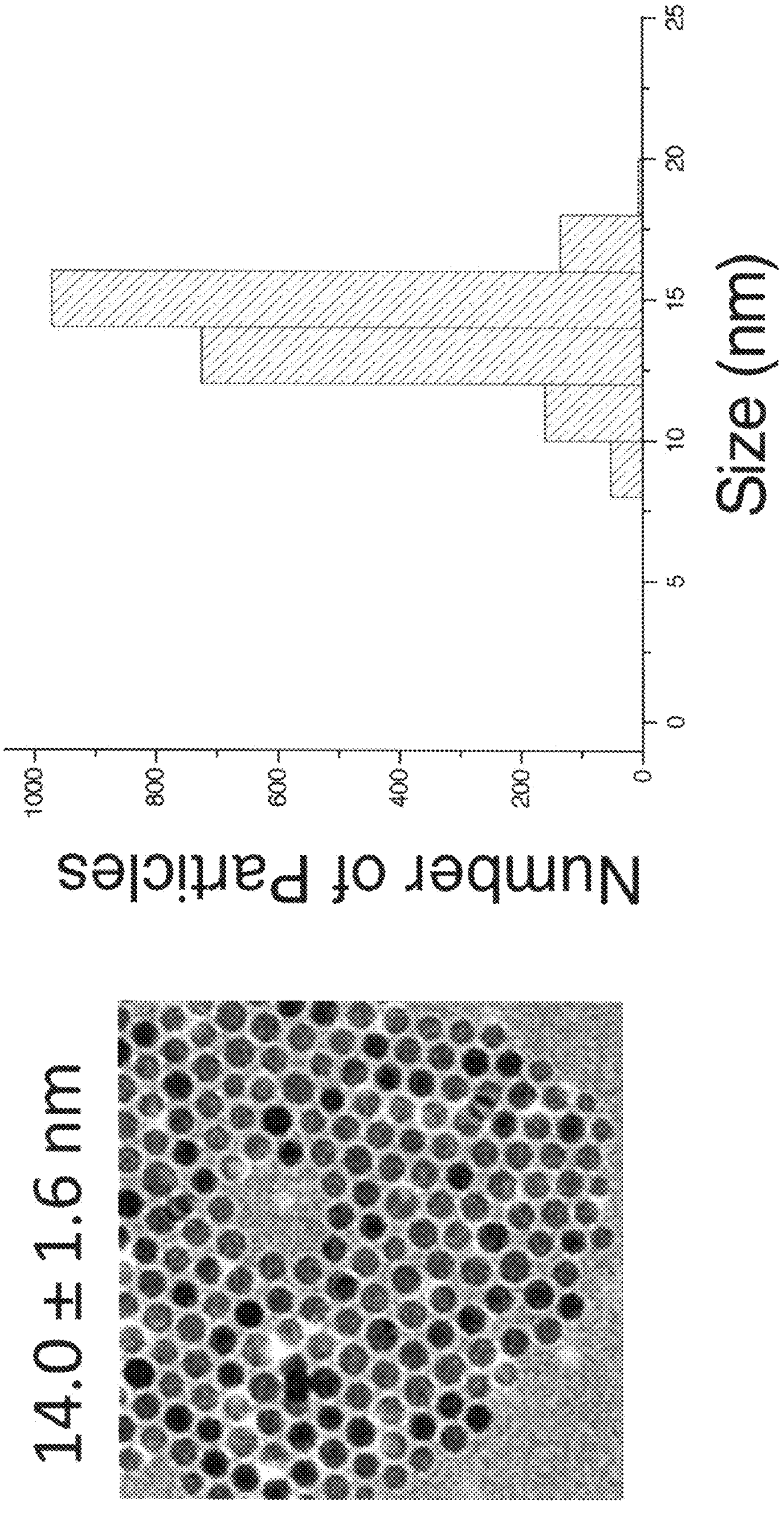
Figure 6:
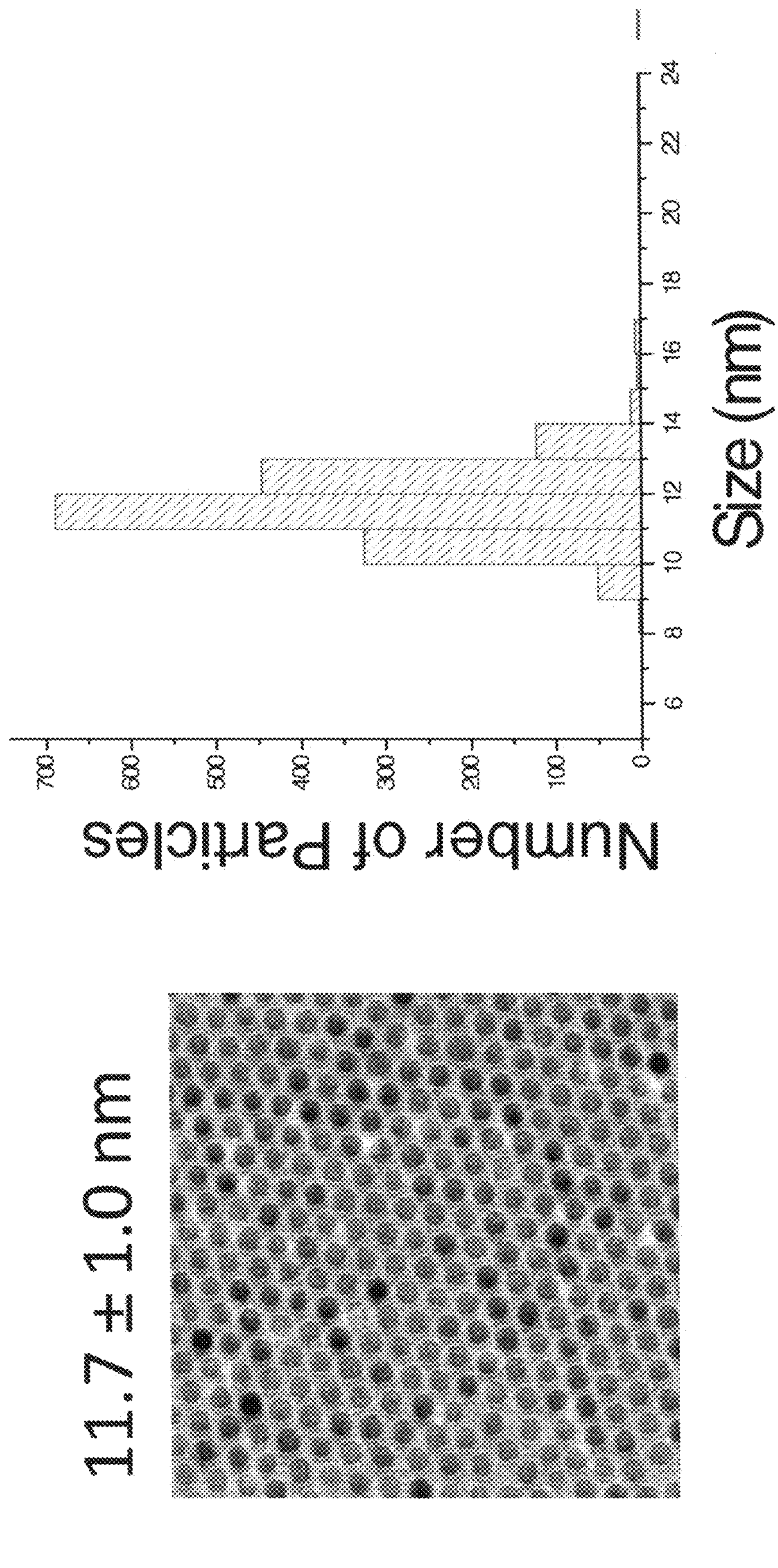
Figure 6:
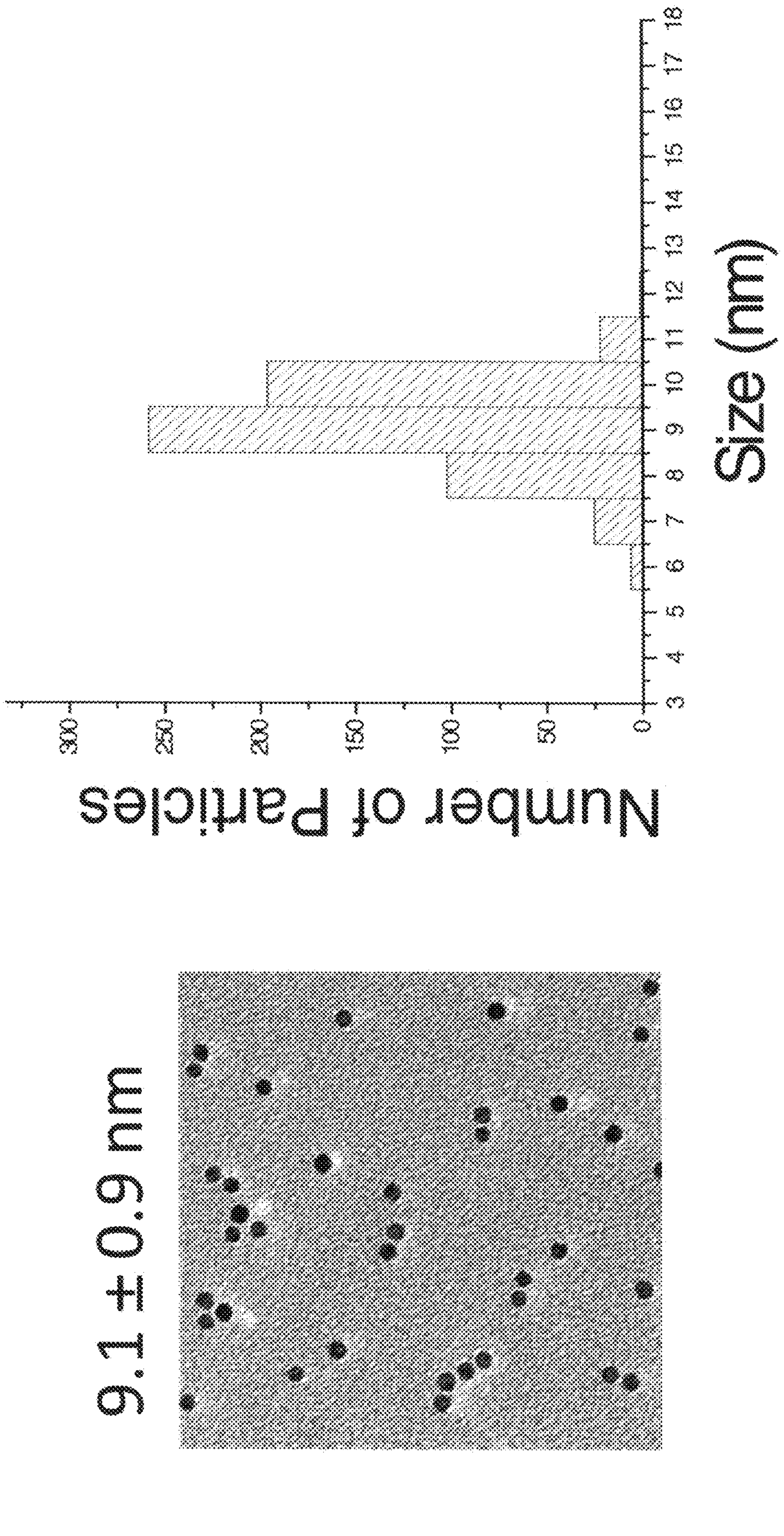
Figure 6:
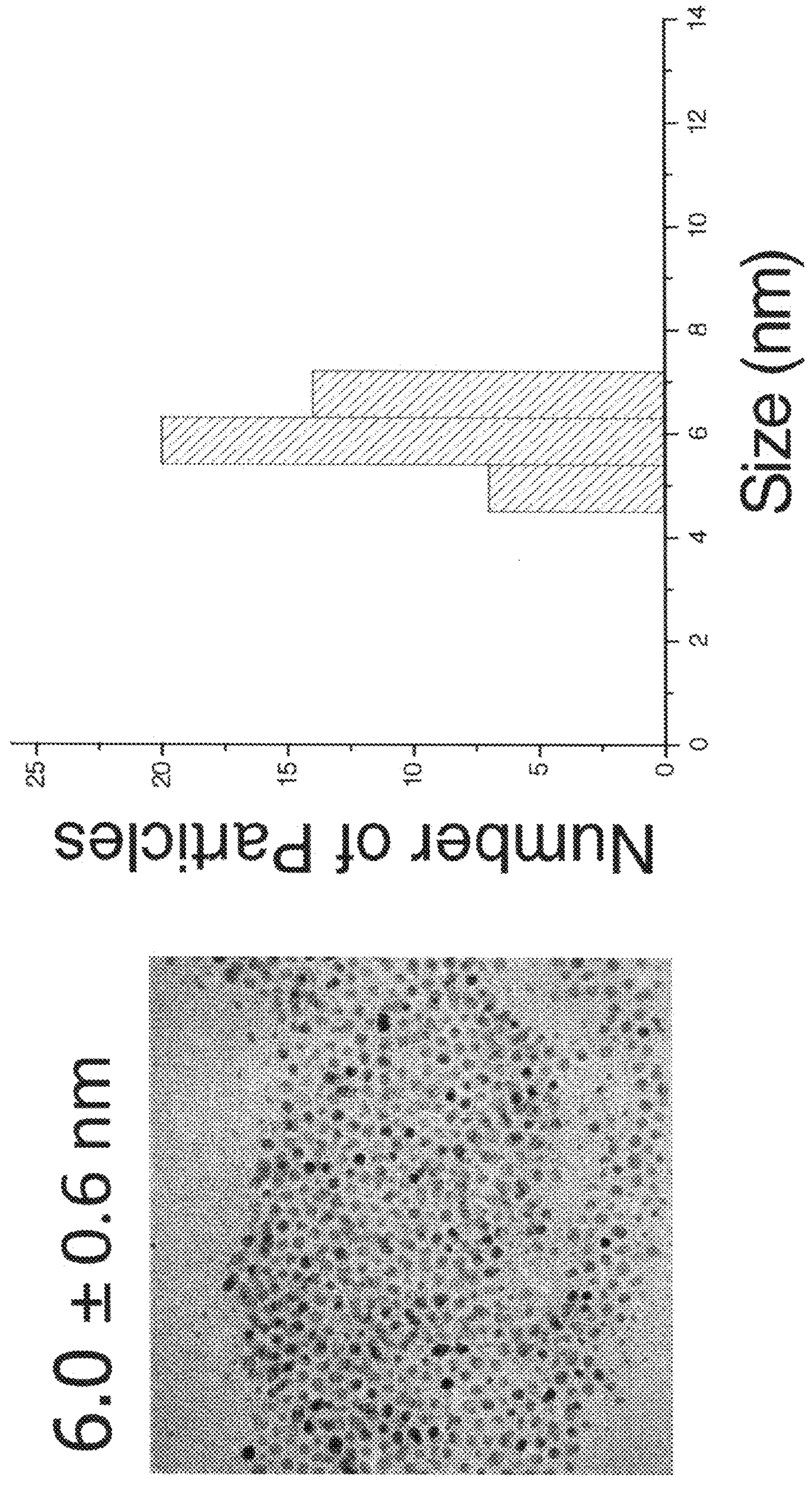
Figure 6:
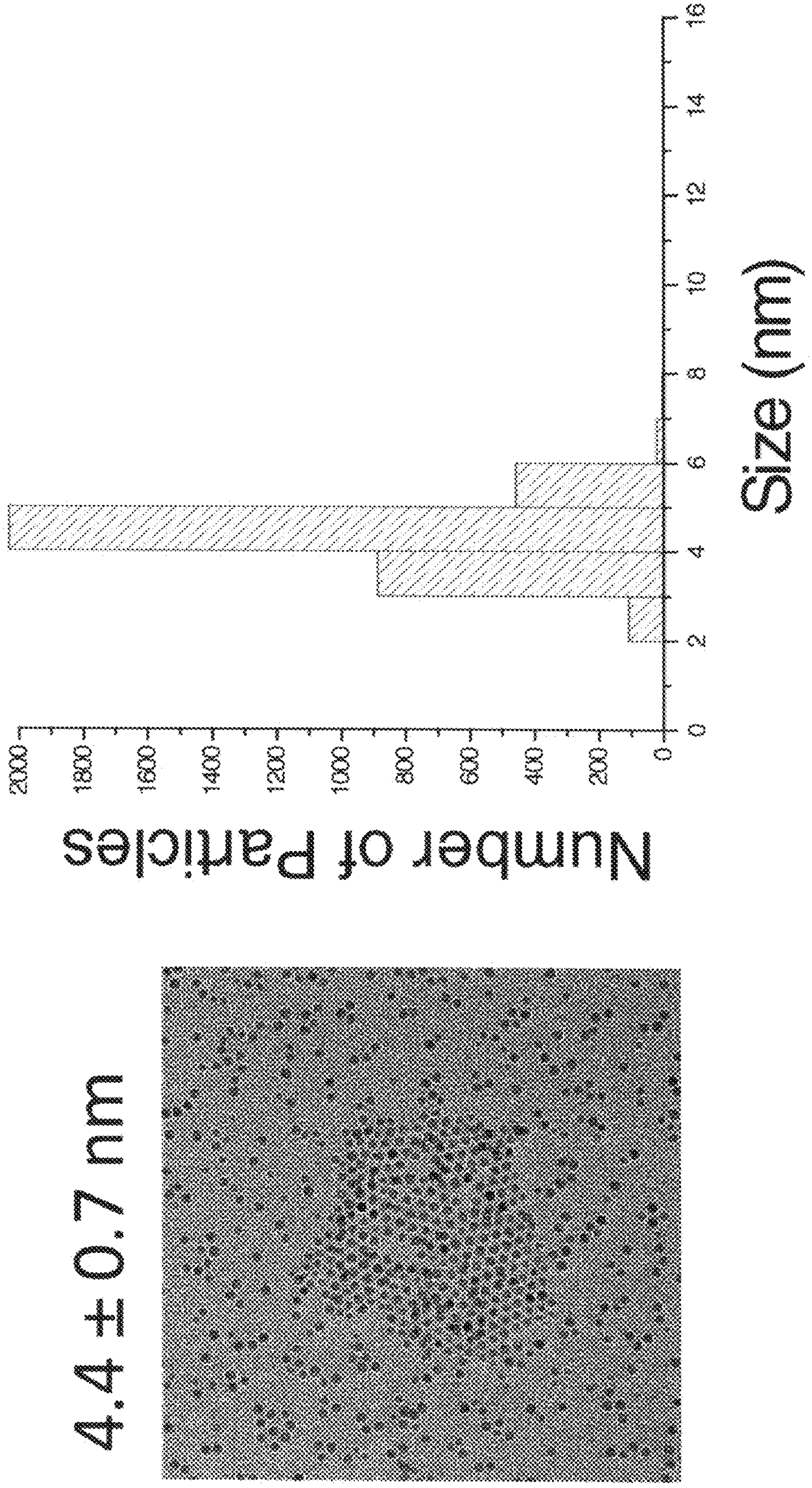

FIG. 6 shows a sample library. Representative transmission electron micrographs of all materials used in this work are shown along with the histogram of their diameters. In this work, the average size as found from counting over 1000 nanoparticles is reported. For these values we used two significant figures which was the error imposed by the sampling error for a population of N=1000.

Figure 7:
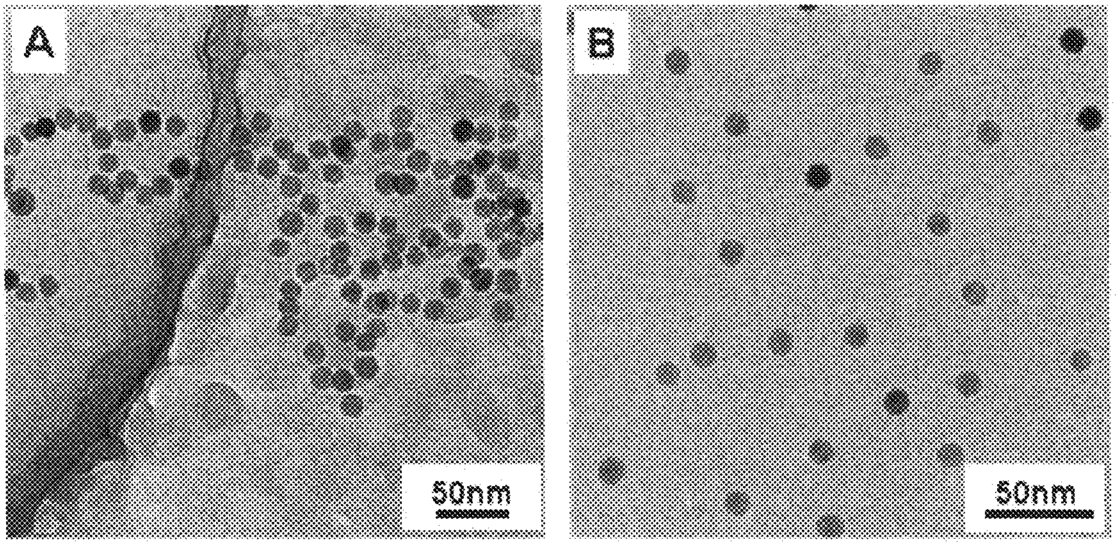

FIG. 7 shows cryogenic transmission electron microscopy of iron oxide nanoparticle suspensions. FIGS. 7A and 7B show cryogenic TEM images of magnetic nanocrystal suspensions before magnetic separation. For these experiments water solutions of iron oxide nanocrystals were flash frozen to produce a thin film of amorphous ice, and this specimen was imaged using a JEOL-200 equipped with a cryogenic sample stage. This technique is widely used in structural biology and the freezing process has been shown to preserve the room temperature solution state structure of complex biomolecules. Panel FIG. 7A shows IGEPAL CO 630® coated nanoparticles similar to those used for arsenic experiments. FIG. 7A is displayed because it contains many nanoparticles and it represents a much more concentrated suspension than that used in this work. These nanoparticles are not fused crystallites nor do they show any indication of large-scale (e.g. >100 nm) clustering. FIG. 7B shows a similar sample which has been stabilized with a thicker amphiphilic polymer coating that is also water soluble. Nanoparticles are well separated in this image and show no evidence of interparticle interactions.

Figure 8:
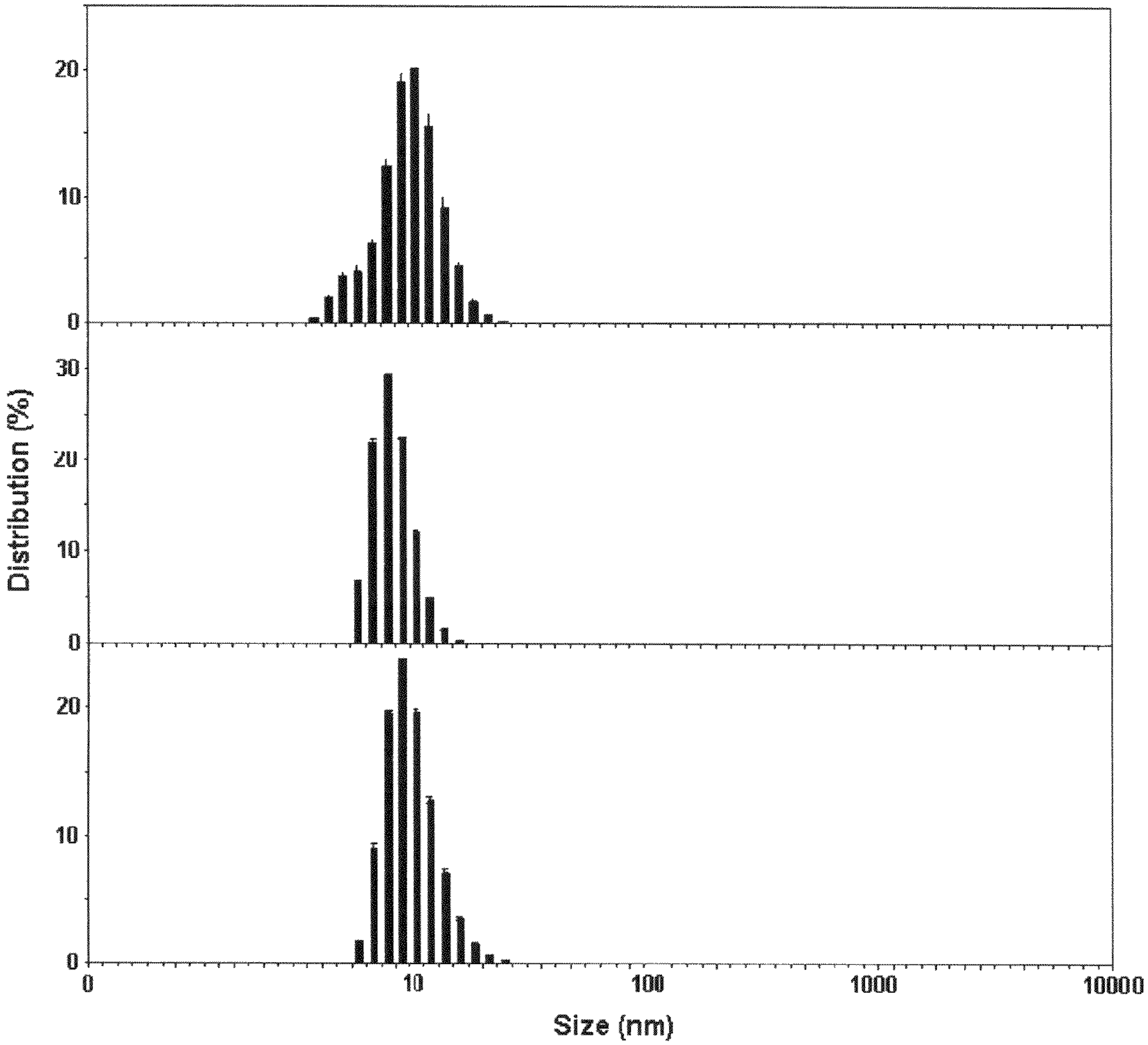

FIG. 8 shows dynamic light scattering (DLS) of iron oxide nanocrystal suspensions. FIG. 8 shows DLS data collected on dilute suspensions of iron oxide nanocrystals using a Malvern Zetasizer Nano ZS machine; a column graph fit was used to calculate the nanoparticle size. All panels show similar results for 4.0, 8.0, and 16 nm iron oxide cores; light scattering finds average particle sizes range from 10 to 20 nm. These results are quite good considering the semi-quantitative nature of DLS when applied to nanoscale systems. Most critically for this work is the complete absence of any aggregates in suspension (e.g. no DLS signals for larger sizes). This is consistent with cryogenic TEM images that show no hard aggregation of these materials.

Figure 9:
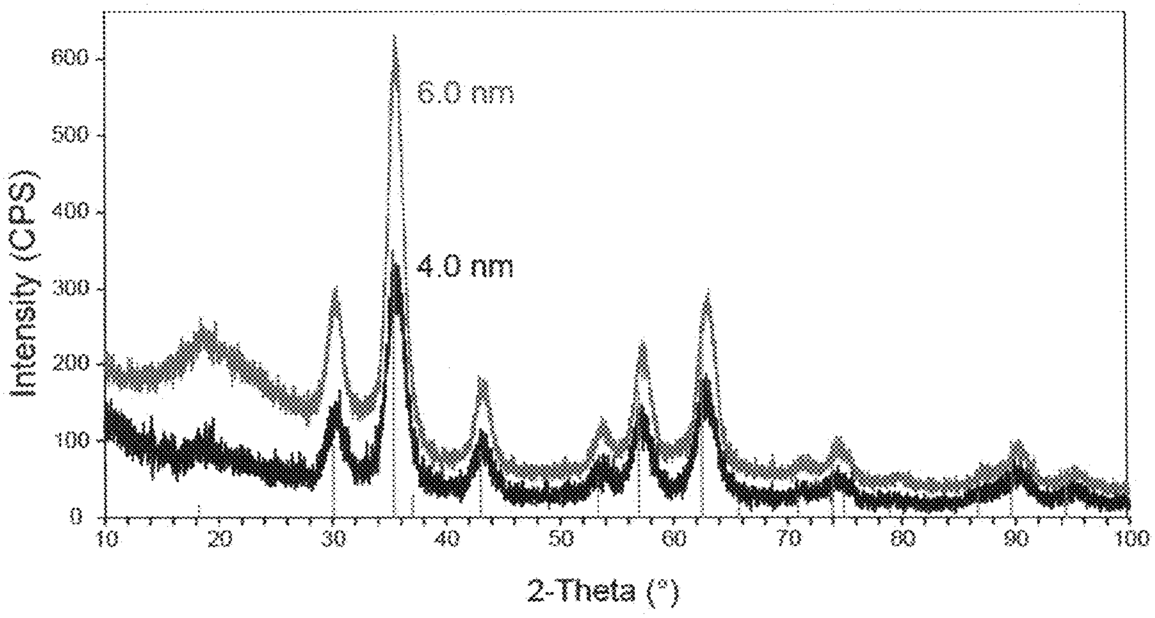

FIG. 9 shows powder x-ray diffraction data for 4.0 and 6.0 nm $Fe_3O_4$ Nanocrystals from a Rigaku D/Max Ultima II. Black plot corresponds to 4.0 nm diameter iron oxide and red plot to 6.0 nm. The orange lines represent the theoretical diffraction pattern for a magnetite crystal from JADE® software's library for crystals. embodiments is not intended to limit the invention to the particular forms disclosed, but on the contrary, this disclosure is to cover all modifications and equivalents as illustrated, in part, by the appended claims.

DESCRIPTION

The present disclosure, according to certain embodiments, generally relates to particle separation. More specifically, the present disclosure, according to certain embodiments, relates to methods for separating magnetic nanoparticles.

In certain embodiments, the present disclosure relates to a method for separating magnetic nanoparticles, the method comprising: providing a sample comprising a plurality of magnetic nanoparticles; passing the sample through a first magnetic field; at least partially isolating nanoparticles of the first nanoparticle size desired; altering the strength of the first magnetic field to produce a second magnetic field; and at least partially isolating nanoparticles of the second nanoparticle size desired.

In certain embodiments, the present disclosure relates to a method of isolating magnetic nanoparticles of a desired size, the method comprising: providing a sample comprising a plurality of nanoparticles; passing the sample through a first magnetic field to remove at least a portion of the nanoparticles in the sample having an average diameter substantially less than the desired size; altering the strength of the first magnetic field to produce a second magnetic field of sufficient strength to isolate at least a portion of the nanoparticles of an average diameter substantially greater than the desired size; and recovering the nanoparticles of the desired size from the magnetic field.

In certain embodiments, the present disclosure relates to a sample comprising a plurality of magnetic nanoparticles formed by a method of the present disclosure.

In certain embodiments, the present disclosure relates to a method for separating magnetic nanoparticles from non-magnetic substances, the method comprising: providing a sample comprising a plurality of magnetic nanoparticles; and passing the sample through a low magnetic field gradient.

In certain embodiments, the present disclosure relates to a method of removing arsenic from a sample, the method comprising: providing a sample comprising arsenic; introducing into the sample magnetic nanoparticles; allowing the magnetic nanoparticles to interact with at least a portion of the arsenic; and passing the sample through a magnetic field to remove at least a portion of the arsenic.

As used herein, the term "nanoparticle" refers to a particle or crystal having a diameter of between about 1 and 1000 nm. Similarly, the term "nanoparticles" refers to a plurality of particles having an average diameter of between about 1 and 1000 nm.

Any magnetic nanoparticle suitable for use in a desired application may be used in the methods of the present disclosure. The magnetic particle may be formed, at least in part, from any material affected by a magnetic field. Examples of suitable materials include, but are not limited to, magnetite, maghemite, hematite, ferrites, and materials comprising one or more of iron, cobalt, manganese, nickel, chromium, gadolinium, neodymium, dysprosium, samarium, erbium, iron carbide, iron nitride. In certain embodiments, the magnetic particles may have a size in the range of from about 1 nm to about 500 nm in diameter and may form clusters of larger sizes. One specific example of a suitable magnetic particle is an iron oxide ($Fe_3O_4$) nanocrystal.

The magnetic nanoparticles may be synthesized using methods known in the art. The methods of the present invention are particularly suited for use with samples of polydisperse magnetic nanoparticles, but may be advantageously applied to monodisperse samples as well.

In some embodiments, the magnetic nanoparticle may be at least partially coated with a surface coating. The surface coating may be any coating suitable for use in a desired application. For example, the magnetic nanoparticle may be functionalized, for example, with biotin/avidin to promote the attachment of biological ligands such as antibodies or fragments thereof. A variety of ligands such as antibodies or derivatives thereof, receptor molecules, opsonins, and the like may be attached to the surface of the magnetic nanoparticle. One of ordinary skill in the art, with the benefit of the present disclosure, may recognize additional suitable surface coatings. Such surface coatings are still considered to be within the spirit of the present disclosure.

The magnetic separator may be any device capable of applying a magnetic field to a plurality of magnetic nanoparticles for subsequent collection. Magnetic separators are well known in the art. One form of suitable magnetic separation device functions by magnetizable particle entrapment and is generally referred to as a High Gradient Magnetic Separator or HGMS. HGMS are particularly suited to colloidal magnetic materials that are not readily separable from solution as such, even with powerful electro-magnets but, instead, require high gradient field separation techniques. One example of a commercially available HGMS is the MACS device made by Miltenyi Biotec GmbH, Gladbach, West Germany, which employs a column filled with a non-rigid steel wool matrix in cooperation with a permanent magnet.

The magnetic separator used in the methods of the present disclosure may depend on, among other things, the nature and particle size of the magnetic particle. Micron-size ferromagnetic particles may be readily removed from solution by means of commercially available magnetic separation devices. In many cases, these devices employ a single relatively inexpensive permanent magnet located external to a container holding the test medium. Examples of such magnetic separators are the MAIA Magnetic Separator manufactured by Serono Diagnostics, Norwell, Mass., the DYNAL MPC-1 manufactured by DYNAL, Inc., Great Neck, N.Y. and the BioMag Separator, manufactured by Advanced Magnetics, Inc., Cambridge, Mass. A specific application of a device of this type in performing magnetic solid-phase radioimmunoassay is described in L. Hersh et al., Clinica Chemica Acta, 63: 69 72 (1975). A similar magnetic separator, manufactured by Ciba-Corning Medical Diagnostics, Wampole, Mass., is provided with rows of bar magnets arranged in parallel and located at the base of the separator. This device accommodates 60 test tubes, with the closed end of each tube fitting into a recess between two of the bar magnets.

In some embodiments, in order to separate magnetic particles of a desired size range, the magnetic field in the magnetic separator is alternated. This may be advantageously used to narrow the size distribution of magnetic nanoparticles. Such alternation of the magnetic field may allow separation of magnetic nanoparticles into narrower size distributions that are substantially free of unwanted nonmagnetic material.

In one example of a method of the present disclosure, a sample of wide size distributed magnetic nanoparticle dispersion may be passed through a magnetic separator (e.g., HGMS) at a specific magnetic field strength corresponding to the size of the smallest nanoparticle size desired. At least a portion of the nanoparticles smaller than those desired may pass through the magnetic separator, and at least a portion of the nanoparticles within and larger than the narrowed size distribution may be retained in the magnetic separator. The magnetic field within the magnetic separator may then be decreased corresponding to the size of the largest nanoparticle size desired. The separated nanoparticles may then be recovered from the magnetic separator. Such a recovery may comprise passing a solvent through the magnetic separator. Such a method may be suitable for large-scale production of magnetic nanoparticles (e.g., iron oxide magnetic nanoparticles) that may initially be produced with a wide size distribution. Accordingly, this method may be used to separate fractions of narrow size distribution from a large scale production to make uniform nanoparticle batches from a non-uniform set.

The methods of the present disclosure may benefit from, among other things, the size dependence of magnetic particle capture, which may make it possible to develop magnetic separation processes that can, in one process, remove several different types of materials. Such capability is particularly important in biotechnology where the simultaneous treatment of mixtures may require more sophisticated multiplexed separations. FIG. 3 demonstrates the principle for magnetic separations in which different field strengths recovered different populations of a bimodal distribution of iron oxide NCs. Initially, the sample consists of two monodisperse fractions of nanocrystals intentionally combined to create a test solution (FIG. 3A); at low applied fields (0.3 Tesla), the effluent from the column contains >90% the smaller size, and the larger size is retained (FIG. 3B). After the field is turned off, a column wash recovered the larger fraction (FIG. 3C). Using monodisperse iron oxide nanocrystals it is thus possible to use magnetic separations in a multiplexed mode and recover different components of a mixture in one treatment.

In another embodiment, magnetic particles are separated from non-magnetic material using very low magnetic field gradients (<100 Tesla per meter). By way of explanation, and not of limitation, as the size of sorbent magnetic nanoparticles decreases, sorption capacities may increase substantially because of, among other things, the increased surface areas in the samples. Accordingly, such methods may be useful for diverse problems such as point-of-use water purification and the simultaneous separation of complex mixtures. For example, high surface area and monodisperse $Fe_3O_4$ nanocrystals (NCs) have been shown to respond to low fields in a size-dependent fashion. The particles apparently do not act independently in the separation, but rather reversibly aggregate through the resulting high field gradients present at the surfaces. Using the high specific surface area of $Fe_3O_4$ NCs 12 nm in diameter, it may be possible to reduce by orders of magnitude the mass of waste associated with arsenic removal from water. Additionally, the size dependence of magnetic separation permitted mixtures of 4 and 12 nanometer $Fe_3O_4$ NCs to be separated by the application of different magnetic fields.

In some embodiments, the methods of the present invention may be used to separate arsenic from a solution, for example, waste water. In operation arsenic may be sorbed onto a magnetic particle surface and removed from the solution by magnetic separation.

The methods of the present disclosure generally may be applied to any application involving magnetic separation. For example, magnetic separators and methods of separation of magnetic particles from non-magnetic media have been described for use in a variety of laboratory and clinical procedures involving biospecific affinity reactions. Such reactions are commonly employed in testing biological samples, including, but not limited to, bodily fluids such as blood, bone marrow, leukapheresis products, spinal fluid, or urine, for the determination of a wide range of target substances, especially biological entities such as cells, proteins, nucleic acid sequences, and the like.

To facilitate a better understanding of the present invention, the following examples of specific embodiments are given. In no way should the following examples be read to limit or define the entire scope of the invention.

EXAMPLES

Example 1

We now show that magnetite particles ($Fe_3O_4$) of a critical size (20 nm) can be removed from solution at very low field gradients (<100 T/m), and present evidence that aggregation caused by the high field gradients at the nanoparticle surfaces helps drive this process. To determine if there exists a critical size for this low field separation, we have prepared $Fe_3O_4$ nanocrystals (NCs) that are highly monodisperse in size and non-aggregated in both aqueous and organic solutions (FIGS. 5-9). Having previously established that the surfaces of nanocrystalline magnetite are useful in the context of arsenic removal from solution, we will use this problem as an example for a high-throughput separation.

Nanocrystalline $Fe_3O_4$ could be removed from solution with a low gradient separator (23 T/m) similar to those applied to recovery of micrometer-sized beads in protein purification. The initial rust colored solution contains $Fe_3O_4$ NCs of 16 nm diameter homogeneously dispersed in water (FIG. 1A). Once placed in the separator, the solution became clear within minutes and a deposit of particles formed at the back of the vial where the field gradient is the largest (FIG. 1B). After removal from the separator, the solution can be restored to its initial state with a vigorous shake. Similar behavior is observed for all NCs larger than ~10 nm, but the time for complete separation varies with solution concentration and NC size.

By way of explanation, and not of limitation, the removal of nanocrystals cannot be explained with a simple model of non-interacting particles. If we assume that the iron oxide particles act independently, we may calculate a size cut-off below which NCs will not be removed. For a 23-T/m field gradient ∇B, the largest magnetic force that can be applied to a single particle of diameter d is $$F_{mag} = \frac{4\pi}{3}\left(\frac{d}{2}\right)^3 M_{sat}\nabla B,$$

where $M_{sat}$ is the saturation magnetization of the material. In order for these particles to separate effectively, this force must exceed the typical Brownian force, $$F_B \sim \frac{k_B T}{d}.$$

For magnetite, with $M_{sat}$=4.69×10$^5$ A/m, at 300 K, this implies that independent particles smaller than ~160 nm in diameter will not separate in the low field gradients we used. The previous analysis ignores the fact that the application of an external field will generate extremely large field gradients (up to $\mu_0 M_{sat}/d$) at the surfaces of single-domain particles. Even in the absence of a field, magnetic NCs may interact due to magnetic dipole-dipole interactions. In the presence of a field, these surface gradients could generate chains or aggregates of NCs. Once the field is removed surface gradients would disappear and particle interactions would diminish. This reversible aggregation provides the advantages of a high surface area nanocrystalline sorbent, without sacrificing the ability to separate the materials in a reasonable field gradient.

Example 2

We characterized the size dependence of the nanocrystal separation process using a high-gradient magnetic separator. Unlike the simple batch separator used in FIG. 1, this system uses an electromagnet to generate external fields of variable strength around a column packed with ferromagnetic wire. Exact measures of the field gradients in such a system are challenging, but most treatments predict that the gradient and applied external field are proportional and that at fields in excess of 1 T, gradients of 10$^4$ T/m are possible. $Fe_3O_4$ NCs of varying sizes were gravity fed into the 22.3-cm long column at various field strengths and the effluent collected and analyzed for iron content using atomic emission spectroscopy. From such experiments, we calculated the fraction of material retained in the column at increasing magnetic field strengths, and compare these retention efficiencies between samples (FIG. 2A).

The size dependence of the retention of NCs in the magnetized column is shown in FIG. 2A. The amount of material retained in the column increases as the external field strength increases. For example, nearly 100% of the 12 nm diameter nanocrystals are retained in the column at applied fields of only 0.2 Tesla, well below the saturation magnetization for stainless steel. This same field, however, cannot capture nanocrystals less than 8.0 nm in diameter. FIG. 2B shows that for all particles, as the domain size becomes smaller more field is required to ensure their complete separation. This result parallels the observation (FIG. 5C) that at low field strengths small nanocrystals are not fully magnetized. Without complete magnetization, the magnetic moments of nanocrystals would be quite small and would not generate enough tractive force with external field gradients.

The size of nanocrystals can also influence their recovery after magnetic capture. As seen in FIG. 2A, at zero external field (after columns are magnetized) nanocrystals larger than 16 nm diameter cannot be removed from the column matrix even after repeated washes. This irreversible interaction is analogous to the fouling of a physical filter, and would limit the use of larger magnetic sorbents in a commercial setting. Smaller nanocrystals, however, do not show such behavior and can be concentrated and reused quite easily (FIG. 2B). This observation stems from the fact that below about 16 nm diameter, iron oxide nanocrystals behave as superparamagnets. In this limit, NCs have no remanent magnetism (FIG. 5E) and thus experience no interactions with the very small stray fields present in the ferromagnetic column matrix. This result is consistent with observations of commercial magnetic beads which found that even in micron-sized systems there was much value to using magnetic materials that were superparamagnetic. The data shown here reveals that superparamagnetism is only one of several properties that should be considered in material design. Indeed, if NCs are too small then magnetic separations require very large critical field strengths to affect any capture of particles (FIG. 2B). For optimal nanocrystal magnetic separations at low fields one should use the largest nanocrystals which still show superparamagnetic properties.

Example 3

The size dependence of NC capture shown in FIG. 2A now makes it possible to develop magnetic separation processes that can in one process remove several different types of materials. Such capability is particularly important in biotechnology where the simultaneous treatment of mixtures requires more sophisticated multiplexed separations. FIG. 3 demonstrates the principle for magnetic separations in which different field strengths recovered different populations of a bimodal distribution of iron oxide NCs. Initially, the sample consists of two monodisperse fractions of nanocrystals intentionally combined to create a test solution (FIG. 3A); at low applied fields (0.3 Tesla), the effluent from the column contains >90% the smaller size, and the larger size is retained (FIG. 3B). After the field is turned off, a column wash recovered the larger fraction (FIG. 3C). Using monodisperse iron oxide nanocrystals it is thus possible to use magnetic separations in a multiplexed mode and recover different components of a mixture in one treatment.

Example 4

Since NCs can be removed from batch solutions using permanent, handheld magnets, we explored whether these NCs could act as effective magnetic sorbents for the removal of arsenic from water. Arsenic is a good model contaminant for these materials as its interaction with iron oxides is strong and irreversible even on the nanoscale particles (26, 38), and its practical and effective removal from groundwater remains an important and intractable problem in water treatment. Conventional high-gradient magnetic separators operating at 1 Tesla and higher already find use in water treatment processes, primarily to induce aggregation of intrinsically magnetic waste products not easily amenable to other methods of coagulation (12, 26, 41, 42).

Both As (III) and As (V) exhibit strong adsorption onto iron oxide nanocrystalline surfaces; as the concentration of arsenic increased in the standard solution, the amount of As bound to NCs increased as well until the capacity of the material was reached (FIG. 4). The interactions between iron oxide and arsenic are also irreversible, so $Fe_3O_4$ NCs that have bound As should not release the material back into the environment during storage and further treatment. These data show clearly that as the size of sorbent NCs decreases, sorption capacities increase substantially because of the increased surface areas in the samples.

Once arsenic was sorbed onto NC surfaces, magnetic separations provided a way to remove the materials from solution. The As concentrations in test solutions before and after removal of particles using a column magnetic separator (Table 1 and Table 2) show that As (III) and As (V) can be reduced to well below the current U.S. standards for drinking water. Table 2 shows the Freundlich isotherms are curve fitted parameters with adsorption data at 0-500 μg/L aqueous concentration using the Freundlich equation, $q=K^F \cdot C_N$, and the correlation coefficients of the adsorption data to the Freundlich equation are listed in Column 7. Also, because the test NCs are very small (12 nm) their very high specific surface areas provide extremely concentrated waste materials. For example, 300-nm iron oxide particles have a sorption capacity of only 0.002% (w/w) and thus to treat 50 L of 500 μg/L arsenic generates 1.4 kg of waste; in contrast, for an equivalent treatment only 15 grams of 12 nm iron oxide sorbent is required.

TABLE 1

A comparison of As removal efficiency assuming a treatment of 2 L of As solution (500 μg/L) with 1 g magnetite

| Particle Size (nm) | As (V) or As (III) | Residual As Concentration (μg/L) | % Removal |
|---|---|---|---|
| 12 | As (III) | 3.9 | 99.2 |
| 20 | As (III) | 45.3 | 90.9 |
| 300 | As (III) | 375.7 | 24.9 |
| 12 | As (V) | 7.8 | 98.4 |
| 20 | As (V) | 17.3 | 96.5 |
| 300 | As (V) | 354.1 | 29.2 |

TABLE 2

| Particle Size (nm) | As (V) or As (III) | Freundlich Slope, $K_F$ ($\mu g^{(1-N)}L^N$/Kg) | Freundlich Exponent, N | Residual As Concentration (μg/L) | % Removal | R |
|---|---|---|---|---|---|---|
| 12 | As (III) | 4.62E5 | 0.56 | 3.9 | 99.2 | 0.982 |
| 20 | As (III) | 1.30E5 | 0.51 | 45.3 | 90.9 | 0.991 |
| 300 | As (III) | 3.09E3 | 0.74 | 375.7 | 24.9 | 0.999 |
| 12 | As (V) | 2.25E5 | 0.72 | 7.8 | 98.4 | 0.990 |
| 20 | As (V) | 2.83E5 | 0.43 | 17.3 | 96.5 | 0.997 |
| 300 | As (V) | 4.46E4 | 0.32 | 354.1 | 29.2 | 0.978 |

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Therefore, the present invention is well adapted to attain the ends and advantages mentioned as well as those that are inherent therein. While numerous changes may be made by those skilled in the art, such changes are encompassed within the spirit of this invention as illustrated, in part, by the appended claims.

What is claimed is:

1. A method for separating magnetic nanoparticles comprising: providing a sample comprising a plurality of magnetic nanoparticles; passing the sample through a first magnetic field; at least partially isolating magnetic nanoparticles of a first nanoparticle size desired; altering the strength of the first magnetic field to produce a second magnetic field; and at least partially isolating magnetic nanoparticles of a second nanoparticle size desired.

2. The method of claim 1, further comprising synthesizing a plurality of magnetic nanoparticles.

3. The method of claim 1 wherein the magnetic nanoparticles comprise iron oxide nanoparticles.

4. The method of claim 1 wherein the sample comprises a plurality of polydisperse magnetic nanoparticles.

5. The method of claim 1 wherein the first magnetic field and second magnetic field are supplied by a magnetic separator.

6. A method of isolating magnetic nanoparticles of a desired size comprising: providing a sample comprising a plurality of magnetic nanoparticles; passing the sample through a first magnetic field to remove at least a portion of the magnetic nanoparticles in the sample having an average diameter substantially less than the desired size; altering the strength of the first magnetic field to produce a second magnetic field of sufficient strength to isolate at least a portion of the magnetic nanoparticles of an average diameter substantially greater than the desired size; and recovering the magnetic nanoparticles of the desired size from the magnetic field.

7. The method of claim 6, further comprising synthesizing a plurality of magnetic nanoparticles.

8. The method of claim 6 wherein the magnetic nanoparticles comprise iron oxide nanoparticles.

9. The method of claim 6 wherein the sample comprises a plurality of polydisperse magnetic nanoparticles.

10. The method of claim 6 wherein the first magnetic field and second magnetic field are supplied by a magnetic separator.

11. The method of claim 6 wherein the step of recovering at least a portion of the magnetic nanoparticles of the desired size from the magnetic field comprises passing a solvent through the magnetic field.

12. A method for separating magnetic nanoparticles from non-magnetic substances comprising: providing a sample comprising a plurality of magnetic nanoparticles; and passing the sample through a low magnetic field gradient that is less than about 100 Tesla per meter.

13. The method of claim 12 wherein the magnetic nanoparticles comprise iron oxide nanoparticles.

14. The method of claim 12 wherein the low magnetic field is supplied by a magnetic separator.

15. The method of claim 12 wherein the sample comprises a plurality of polydisperse magnetic nanoparticles.

16. A method of removing arsenic from a sample comprising: providing a sample comprising arsenic; introducing into the sample magnetic nanoparticles; allowing the magnetic nanoparticles to interact with at least a portion of the arsenic; and passing the sample through a magnetic field to remove at least a portion of the arsenic.

17. The method of claim 16 wherein the step of passing the sample though a magnetic field to remove at least a portion of the arsenic comprises using a magnetic separator.

18. The method of claim 16, further comprising passing the sample through a magnetic field to remove at least a portion of the magnetic nanoparticles.

19. The method of claim 16 wherein the magnetic nanoparticles comprise iron oxide nanoparticles.

20. The method of claim 16 wherein the magnetic nanoparticles comprises a plurality of polydisperse magnetic nanoparticles.

* * * * *